United States Patent

Trageser et al.

[11] 3,846,746
[45] Nov. 5, 1974

[54] PILOT WARNING INDICATOR SYSTEM

[75] Inventors: James H. Trageser; Joseph A. Cali, both of Dayton, Ohio

[73] Assignee: Technology Incorporated, Dayton, Ohio

[22] Filed: Apr. 23, 1973

[21] Appl. No.: 353,348

Related U.S. Application Data

[62] Division of Ser. No. 47,823, June 19, 1970, Pat. No. 3,736,559.

[52] U.S. Cl. ............................ 340/27 R, 340/25
[51] Int. Cl. ............................................. G08g 5/00
[58] Field of Search......... 340/27 R, 27 NA, 25, 23; 343/112 CA; 250/199

[56] References Cited
UNITED STATES PATENTS

| | | | |
|---|---|---|---|
| 3,183,480 | 5/1965 | Adler, Jr. ........................... | 340/27 R |
| 3,203,305 | 8/1965 | Fairbanks.......................... | 340/27 R |
| 3,310,806 | 3/1967 | Stansbury..................... | 343/112 CA |
| 3,341,812 | 9/1967 | Perkinson et al.................... | 340/23 |
| 3,345,633 | 10/1965 | Runge .......................... | 343/112 CA |
| 3,527,949 | 9/1970 | Huth et al. ......................... | 250/199 |
| 3,620,626 | 11/1971 | Daly et al. ............................ | 340/25 |
| 3,652,981 | 3/1972 | Campanella.................. | 343/112 CA |
| 3,708,671 | 1/1973 | Story.............................. | 340/27 R |

*Primary Examiner*—Kathleen H. Claffy
*Assistant Examiner*—Thomas L. Kundert
*Attorney, Agent, or Firm*—Jacox & Meckstroth

[57] ABSTRACT

A system for detecting the presence of intruder aircraft within the region of a given aircraft and for warning the pilot of the given aircraft if an intruder aircraft is traveling in such a manner that a collision may result. The system includes signaling means carried by the intruder aircraft which continuously indicates the altitude and/or heading thereof. The system includes means for providing signals related to the heading and/or altitude of the given aircraft. The system also includes means for decoding signals received from the intruder aircraft and for comparing such signals with the signals related to the altitude and/or heading of the given aircraft and for providing a warning if a potential collision condition exists.

19 Claims, 7 Drawing Figures

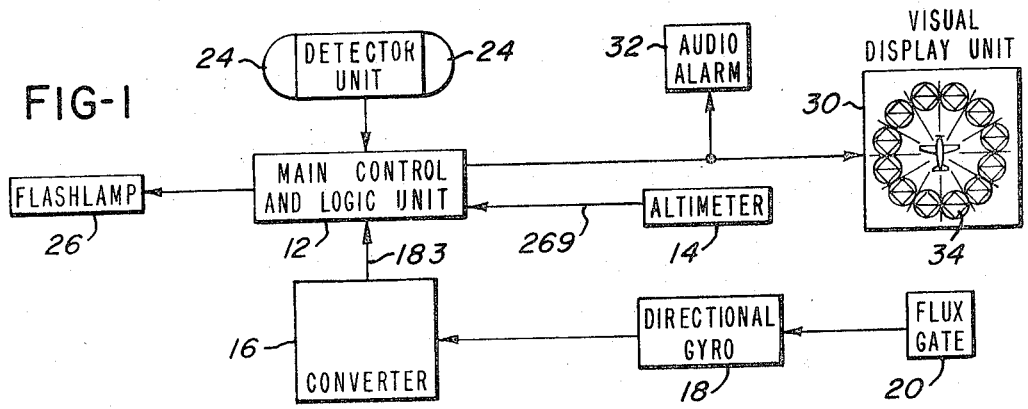
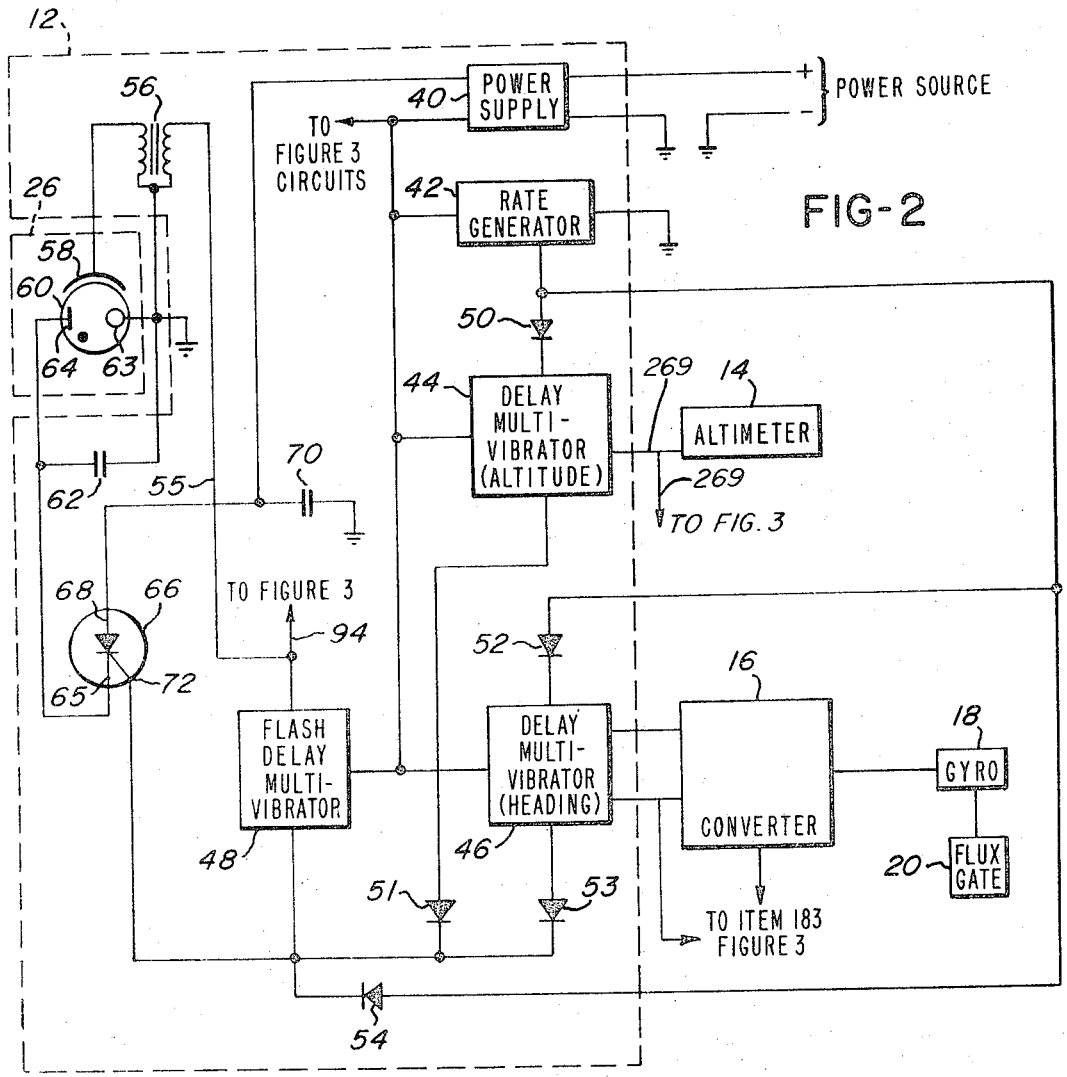

FIG-6

HEADING THREAT CRITERIA
FOR REFERENCE FAMILY EXPRESSION
LESS THAN 360 DEGREES
NO THREAT IF:

SECTOR 1: $H_I < H_R + 180$ & $> H_R$
SECTOR 2: $H_I < H_R + 270$ & $> H_R$
SECTOR 3: $H_I < H_R$ OR $> H_R + 90$
SECTOR 4: $H_I < H_R$ OR $> H_R + 180$

FIG-7

HEADING THREAT CRITERIA
FOR REFERENCE FAMILY EXPRESSION
LARGER THAN 360 DEGREES
NO THREAT IF:

SECTOR 1: $H_I < H_R + 180$ OR $> H_R$
SECTOR 2: $H_I < H_R + 270$ OR $> H_R$
SECTOR 3: $H_I < H_R$ & $> H_R + 90$
SECTOR 4: $H_I < H_R$ & $> H_R + 180$ 3,846,746

PILOT WARNING INDICATOR SYSTEM

RELATED APPLICATION

This application is a division of Patent application 047,823, filed June 19, 1970, now U.S. Pat. No. 3,736,559.

BACKGROUND OF THE INVENTION

An object of this invention is to provide a pilot warning indicator system which continuously "monitors" the space or region surrounding an aircraft and which provides a warning signal to the pilot of the aircraft if the possibility of a collision with another aircraft exists.

Another object of this invention is to provide such a pilot warning indicator system which can be used in combination with signal lighting means presently used on aircraft.

Another object of this invention is to provide such a pilot warning indicator system, the operation of which is not changed or which does not depend upon the attitude of the aircraft which is protected by the system or the aircraft which is monitored by the system.

Another object of this invention is to provide such a pilot warning system which, as a part thereof, may employ lamps or lighting fixtures now carried by an aircraft.

Another object of this invention is to provide such a system which can be used with surface vehicles as well as with aircraft.

Another object of this invention is to provide such a system which provides a warning signal to a pilot, only when the possibility of collision with another craft exists, and which assists the pilot in readily locating the position of an aircraft which presents a collision threat.

Another object of this invention is to provide such a system which is capable of using either analog or digital techniques.

SUMMARY OF THE INVENTION

The apparatus of this invention is adapted to be carried by a craft such as an aircraft or watercraft or other vehicle, which is herein referred to as the first aircraft or given aircraft or reference craft. It is to be understood, of course, that both craft involved in a particular encounter may carry apparatus made in accordance with this invention and the "first" or "reference" is used only for descriptive identification thereof.

The apparatus carried by the first craft includes a main control unit which receives information regarding the altitude and/or heading of the first craft. This altitude and/or heading information is directed into the electrical circuitry of a flashlamp unit in which signals are developed which cause a flashlamp or some other electrical to optical transducer, such as a laser or an incandescent lamp, to discharge spaced-apart pulses of light energy. The time spacing between these pulses of light energy is directly related to the altitude and/or heading of the first aircraft. Thus, information regarding the altitude and/or heading of the first aircraft is disseminated into a region surrounding the first aircraft.

The first or reference aircraft also carries a detector unit, which may be in the form of a plurality of photocells or other optical to electrical signal transducer devices arranged in a given formation, and arranged to detect flashes or pulses of light which are disseminated from another aircraft, herein referred to as a second aircraft or intruder aircraft or intruder craft. These detected flashes or pulses of light are signals which provide a direct indication of the altitude and/or heading of the second aircraft. These signals are directed into a main control unit which is carried by the first aircraft. In the main control unit the signals are compared with the altitude and/or heading of the second aircraft. If the information received by the main control unit of the first aircraft indicates that the possibility of a collision between the first aircraft and the second aircraft exists, the main control unit causes audio and/or visual signals to be created so that the pilot of the first aircraft may change the altitude and/or heading of his aircraft to avoid a collision with the second aircraft.

BRIEF DESCRIPTION OF THE DRAWINGS

FIG. 1 is a diagrammatic view of a pilot warning indicator system made in accordance with this invention.

FIG. 2 is a diagrammatic view of the transmission portion of a pilot warning indicator system made in accordance with this invention, showing the elements thereof in greater detail than in FIG. 1.

FIG. 6 is a set of heading threat criteria equations is mechanizable form which relate to FIG. 5.

FIG. 7 is another set of heading threat criteria equations which relate to FIG. 5.

SYSTEM OPERATION SUMMARY

Figure 3:
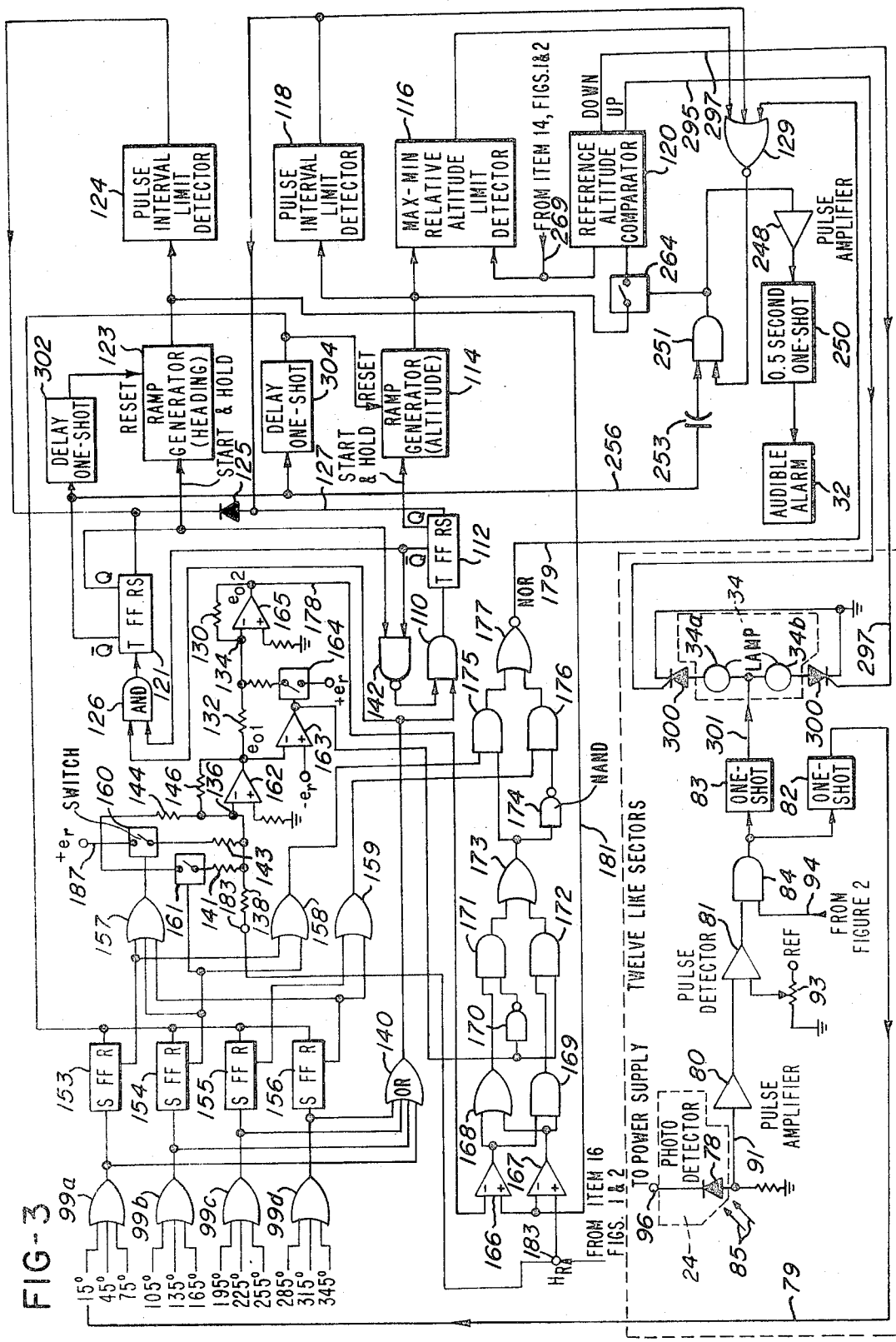
FIG. 3 is a diagrammatic view of a receiver and analyzer portion of the system of this invention showing the elements thereof in greater detail than in FIG. 1.

Apparatus shown in FIG. 1 is herein described as being supported by a first aircraft, or reference aircraft or protected aircraft.

In the system as shown in FIG. 1, a main control and logic unit 12 has connected thereto, as an input, means suitable for obtaining signals representative of altitude. Herein an altimeter 14 is shown. The altimeter 14 may be an altimeter digitizer or pressure altitude transducer or any other device which is capable of providing altitude signals in electrical form.

Also, joined to the main control and logic unit 12 in FIG. 1 as an input, is any suitable means for obtaining signals representative of the heading of the first or reference aircraft, such as a synchro to analog or digital converter 16 or other device which is capable of providing signals representative of heading. This may include a directional gyroscope 18 or the like as shown. A flux gate or flux valve 20 may be joined to the directional gyroscope 18.

Also, joined to the main control and logic unit 12, as an input, is a detector unit 24 which, for example, may consist of two portions, each of which is mounted adjacent a wing tip of the aircraft. However, portions of the detector unit 24 may be mounted at any other suitable parts of the aircraft.

Joined to the main control and logic unit 12 is a flashlamp unit 26, which may comprise one or more lamp assemblies or other electrical to optical transducer devices which are mounted at portions of the aircraft so that light energy emanating therefrom is visible within substantially the entire region surrounding the aircraft.

Also, joined to the main control and logic unit 12 is a visual display unit 30 and an audio alarm unit 32. The visual display unit 30 includes a group of indicator lamps 34 arranged in circular formation, shown in detail in FIG. 4.

The altimeter 14 and the directional gyroscope 18 provide information to the main control and logic unit 12 pertaining to the heading and altitude of the first or reference aircraft. The main control unit 12 energizes the flashlamp unit 26 in a manner to cause spaced-apart pulses of light energy to be discharged therefrom. For example, the flashlamp unit 26 may discharge a series of three spaced-apart pulses of light energy each cycle of operation. The time spacing between the first and second pulses of the series may be directly related to the altitude of the aircraft, and the time spacing between the first and third pulses of each series may be directly related to the heading of the aircraft.

The detector unit 24 is constantly sensing light energy from the region around the aircraft and transmits signals in regard thereto to the main control and logic unit 12. When spaced-apart pulses of light energy are received by the detector unit 24 from a second aircraft to indicate the altitude and/or heading thereof, the signals are compared with those created by the altimeter 14 and the directional gyroscope 18 of the first aircraft. The main control and logic unit 12 compares the information received from the detector unit 24 and from the altimeter 14 and the directional gyro 18. If the information indicates that the possibility of a collision may exist, one or more of the indicator lamps 34 is lighted to indicate generally the bearing of the intruder aircraft. At the same moment the audio alarm unit 32 is energized. Thus, the pilot of the first aircraft is alerted to determine visually whether a change in heading and/or altitude of his aircraft is necessary to avoid a collision.

TRANSMISSION OF ENCODED DATA PULSES

The apparatus of FIG. 2 is an example of circuitry which may be used to control energization of the flashlamp unit 26 shown in FIGS. 1 and 2.

In FIG. 2, a power supply unit 40 is shown joined to a rate generator 42 and to an altitude delay multivibrator 44, and to a heading delay multivibrator 46, and to a flash delay multivibrator 48. A diode 50 joins the rate generator 42 to the delay multivibrator 44. A diode 52 joins the rate generator 42 to the delay multivibrator 46, and a diode 54 joins the rate generator 42 to the delay multivibrator 48. A diode 51 joins the altitude delay multivibrator 44 to the flash delay multivibrator 48 and to a gate 72 of a silicon controlled rectifier 66. A diode 53 joins the heading delay multivibrator 46 to the flash delay multivibrator 48 and to the gate 72 of the silicon controlled rectifier 66.

A conductor 55 joins a transformer 56 to the delay multivibrator 48. The transformer 56 is connected to a trigger electrode 58 of a flashlamp 60 which represents one or more lamps or other electrical to optical transducers contained in the flashlamp unit 26. A capacitor 62 is connected across the flashlamp 60 and is joined to an anode 64 and to a cathode 63 of the flashlamp 60. The anode 64 of the flashlamp 60 is connected to a cathode 65 of the silicon controlled rectifier 66. An anode 68 of the silicon controlled rectifier 66 is connected to an energy storage capacitor 70 and to the power supply unit 40. The gate 72 of the silicon controlled rectifier 66 is connected to the commonly connected cathode terminals of diodes 51, 53, and 54.

The altimeter unit 14 is joined to the delay multivibrator 44, and the synchro to analog or digital converter 16 is joined to the delay multivibrator 46.

When the circuitry of FIG. 2 is in operation, the energy storage capacitor 70 is constantly charged by the power supply unit 40, and the capacitor 70 is periodically discharged into the capacitor 62 by short intervals of conduction through the silicon controlled rectifier 66.

The rate generator 42 which controls the repetition frequency of the FIG. 2 circuitry discharges pulse signals at some fixed frequency, for example, one pulse signal every second. This pulse signal flows through the diode 54 to the gate 72 of the silicon controlled rectifier 66. Upon receiving this gate pulse, the silicon controlled rectifier 66 conducts current and thereby delivers energy from the capacitor 70 to the capacitor 62. The capacitor 70 is much larger in capacity than the capacitor 62. Thus, when the silicon controlled rectifier 66 conducts current, a small part of the charge upon the capacitor 70 flows to the capacitor 62 and charges the capacitor 62, which is connected between the anode 64 and the cathode 63 of the flashlamp 60 of the flashlamp unit 26. The electrical energy discharged from the capacitor 70 by the conduction of the silicon controlled rectifier 66 is replaced within a short period of time by current flowing to the capacitor 70 from the power supply unit 40. As soon as the capacitor 62 is charged, the voltage across the silicon controlled rectifier 66 falls to such a low value that current conduction therethrough ceases.

The pulse signal from the rate generator 42 also flows through the diode 54 to the flash delay multivibrator 48, causing the flash delay multivibrator 48 to begin a flash delay timing operation. After a fixed time interval, which provides sufficient time for charging the capacitor 62, the flash delay multivibrator 48 provides an output pulse signal which flows through the transformer 56 to the trigger electrode 58 of each flashlamp 60 in the flashlamp unit 26. Since the capacitor 62 across each flashlamp 60 was fully charged during the period of the flash delay multivibrator 48, a pulse signal to the trigger electrode 58 causes the flashlamp 60 to fire, thereby emitting a pulse of optical or light energy from the flashlamp unit 26.

The pulse of electrical energy which flowed from the rate generator 42 to the silicon controlled rectifier 66 and to the delay multivibrator 48, also flowed to the altitude delay multivibrator 44 which is joined to the altimeter unit 14. Thus, a timing operation within the altitude delay multivibrator 44 was also commenced by the pulse from the rate generator 42. After a period of time which is dependent upon signals received from the altimeter unit 14, the delay multivibrator 44 discharges a pulse of electrical energy which flows through the diode 51 to the gate 72 of the silicon controlled rectifier 66. Thus, current again flows through the silicon controlled rectifier 66 and thereby from the capacitor 70 to the capacitor 62 for charging the capacitor 62 a second time.

The pulse of electrical energy from the output of the altitude delay multivibrator 44 also flows through the diode 51 to the flash delay multivibrator 48, which, after the same predetermined period of time, discharges a second pulse of electrical energy to the transformer 56 and to the trigger electrode 58 of each flashlamp 60. The flashlamp 60 thereupon discharges a second pulse of light energy. Thus, two spaced-apart pulses of light energy have been discharged from the flashlamp unit 26. The time spacing between the pulses is in direct relationship to the altitude of the aircraft as determined by the altimeter unit 14.

The pulse of electrical energy which flowed from the rate generator 42 to the delay multivibrator 44, also flowed to the heading delay multivibrator 46, which is joined to the synchro converter 16 and thence to the directional gyro 18. Thus, a timing operation within the heading multivibrator 46 is also commenced by the output pulse of the rate generator 42. After a period of time which is made dependent upon signals received from the synchro converter 16, the heading delay multivibrator 46 discharges a third pulse of electrical energy which flows through the diode 53 to the gate 72 of the silicon controlled rectifier 66. Thus, the silicon controlled rectifier 66 again conducts and delivers energy from the capacitor 70 to the capacitor 62.

The output of electrical energy from the heading delay multivibrator 46 also flows through the diode 53 to the flash delay multivibrator 48, which after a predetermined period of time discharges through the transformer 56 a third pulse of electrical energy to the trigger electrode 58 of the flashlamp 60. Thus, each flashlamp 60 of the flashlamp unit 26 again discharges a pulse of light energy.

From this sequence of events it is understood that the flashlamp unit 26 has discharged three pulses of light energy. The signal which initiated the first of these pulses of light energy also caused a measurable period of time to begin, after which the second pulse of light energy occurred; this period of time elapsing between the first and second light pulses was directly related to the altitude of the transmitting aircraft. The third pulse of light energy occurred after another period of time had elapsed and the period of time elapsing between the first and third light pulses was directly related to the heading of the transmitting aircraft. These spaced-apart flashes of light energy which are in direct relationship to the altitude and heading of the aircraft repeat continuously at a frequency determined by the rate generator 42 so that other aircraft in the region of the transmitting aircraft are informed of the altitude and heading thereof.

The diodes 51, 53, and 54 may be combined into a single input OR gate since electrically their function consists only of admitting signals from any one of the time interval generators 42, 44, or 46 to the flash delay multivibrator 48.

The synchro to analog or digital converter unit 16, in FIG. 2 may, in some embodiments of the invention, be dispensed with entirely since its essential function is only to convert the information signal from gyro unit 18 into a form which is acceptable for use in the heading delay multivibrator 46. If the output signal from the gyro 18 consists of an analog voltage or a varying resistance or some other form which is compatable with the circuitry used in mechanizing the delay multivibrator 46, there is no requirement for the synchro to analog or digital converter circuit 16.

The power supply 40 shown in FIG. 2 is a multi-voltage power supply capable of providing both high voltage, high energy DC voltage to the flashlamp 60 or other electrical to optical transducer devices and capable of providing low voltage well regulated DC voltages for use in the circuitry of FIG. 2 and FIG. 3.

At several points in this specification a flashlamp or flashlamps 60 for the electrical to optical transducer device 26 are referred to. One type of lamp which may be used for this purpose is a gas-filled lamp which is currently in the state of the art with regard to aircraft. The circuitry shown in FIG. 2 is illustrative of the type of electrical components and signals which cooperate with a lamp of the xenon gas type.

It is intended, however, that the present invention not be limited to the use of a xenon flashlamp or evven to a lamp in the gaseous family, as there are several other classes of electrical to optical transducer devices which may be employed. For example, laser electrical to optical transducer device or other types of devices may be employed.

As stated above, the protected aircraft, or the first aircraft, or the reference aircraft, is the aircraft which is considered herein as that in which the pilot may be warned of a collision possibility. The other aircraft, the aircraft which may pose the collision threat to the reference aircraft, is called the intruder aircraft. Of course, the intruder aircraft may also include a system of this invention for warning the pilot thereof if a possibility of collision exists.

The portion of this invention which is now to be described is shown in FIG. 3. This portion of the system includes an optical to electrical transducer or photodetector device such as a photo diode or photodetector 78. Actually, preferably there are a plurality, perhaps twelve, photodetectors 78 each of which is arranged within the detector unit 24, shown in FIG. 1. These are arranged so that the complete region surrounding the first aircraft may be "observed" or "monitored" thereby. A conductor 96 joins the photodetectors 78 to a suitable power supply. Each photodetector 78 has a pulse amplifier 80 joined thereto by means of a conductor 91. A pulse detector 81 is joined to the pulse amplifier 80. An AND gate 84 is connected to the pulse detector 81. The AND gate 84 is connected to two one-shot multivibrators 83 and 82.

Incoming light pulses from an intruder aircraft are represented by arrows 85 which may engage one or more photodetectors 78. These light pulses are impressed upon each photo diode 78 engaged thereby. In each photo diode 78 the light energy received from an intruder aircraft is converted into pulses of electrical energy which induce a voltage change upon the pulse amplifier 80 and upon the pulse detector 81. The pulse detector 81 is essentially some form of analog to digital converter circuit such as a high gain amplifier circuit. This circuit compares the magnitude of the amplified light pulse signals supplied by the pulse amplifier 80 with the magnitude of some adjustable reference signal and provides an output signal having a fixed magnitude (a digital signal) whenever the pulse signals received from the pulse amplifier 80 exceed the amplitude of the selected reference signal. A potentiometer 93 provides a manual adjustment capability for this reference signal.

The potentiometer 93 may also be used to increase the ability of the system to maintain surveillance of a second aircraft which presents weak signals by reason of its separation distance or the orientation of its flashlamp with respect to the detector unit 24 of the reference aircraft.

In some installations it may be necessary or advisable to include circuitry which provides compensation to exclude background illumination which may be imposed upon the photodetectors 78 of the optical to electrical detector unit 24 by the sun or the moon or other sources of light having a time rate of change much slower than the information pulses utilized in this system.

The digital signal flowing from the pulse detector circuit 81 is coupled to the logic AND gate 84. The other input terminal of the AND gate 84 is joined by a conductor 94 to the conductor 55, shown in FIG. 2. The AND gate 84 serves the purpose of preventing signals discharged from the flashlamp unit 26 of the reference aircraft, from entering the receiver circuitry as data signals. This is accomplished by holding the AND gate 84 in its non-transmitting or non-enabled state during the time the flashlamp unit 26 of the reference aircraft is illuminated. The output pulse of the delay multivibrator circuit 48, shown in FIG. 2, suitably establishes the period of the flashlamp unit 26 illumination to accomplish this exclusion.

The digital signals at the output of the AND gate 84 represent pulses of light received by the detector unit 24 from an intruder aircraft which is in the region of the reference aircraft. The one-shot multivibrator 83 serves to stretch the duration of the first digital pulse received from AND gate 84 into a time which is long enough for the pilot to observe the lamp illuminated on the display indicators 30. The exact time period of the one-shot multivibrator 83 is a matter of design choice. The time period may be made short to allow the indicator lamp 34 in the display unit 30 to flash as each new set of pulses from an approaching second aircraft is received or may be made long so that the indicator lamp 34 remains illuminated whenever a second aircraft is sufficiently close to activate the system.

The data pulses emanating from the AND gate 84 are also applied to a second one-shot multivibrator 82. The one-shot multivibrator 82 serves the function of converting the flash data information into pulses having a uniform and predictable time duration, preferably, a time which is convenient for use in the logic circuitry which subsequently operates upon the data received. The pulse detector 81 provides a digital output during the time that the pulse amplifier 80 has an output larger than a reference signal provided by the potentiometer 93.

Figure 4:
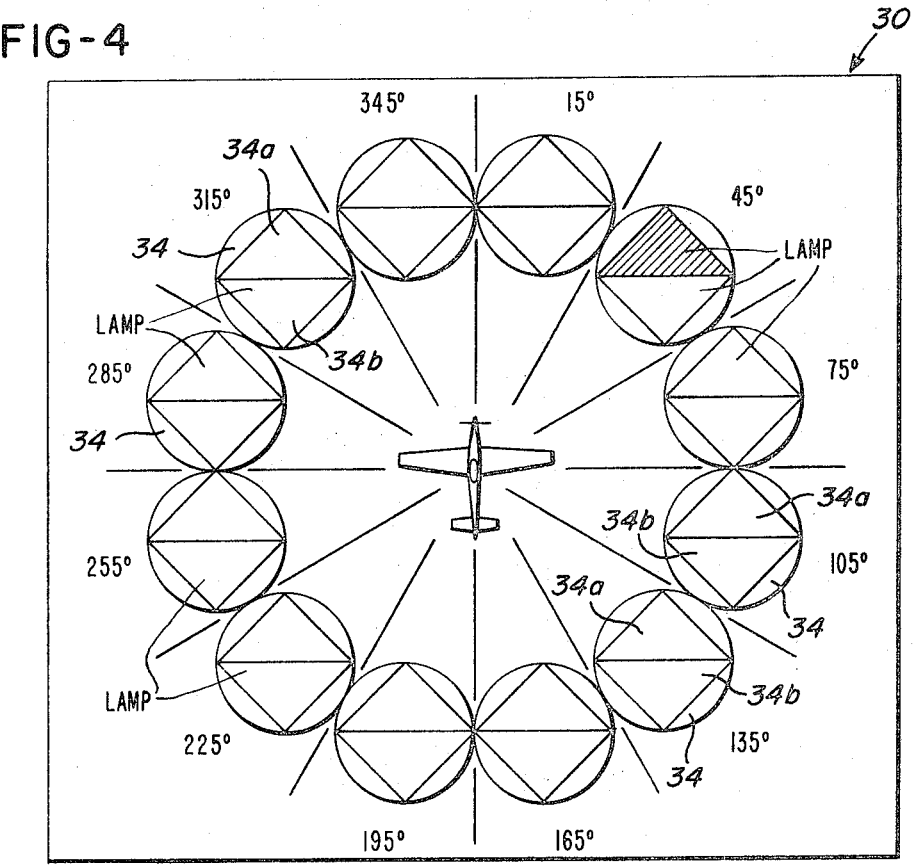
FIG. 4 is a diagrammatic view of a visual display unit of the pilot warning indicator system of this invention.

In the presently described embodiment of the pilot warning indicator system, the space surrounding the reference aircraft is divided into twelve diverging angular sectors each of which intercept an angle of 30° in the plane in which the reference aircraft is traveling. The photodetectors 78 of the unit 24 are arranged to sense light from these sectors. These sectors are illustrated in the display unit 30, as shown in FIG. 4. Dividing the space surrounding the aircraft into sectors other than 30 degree angular sectors is, of course, possible in a system of this invention.

As an example, a signal emanating from an intruder aircraft located anywhere within a space region identified as the 45 degree sector shown in FIG. 4 will be received by one photodetector 78, shown in FIG. 3, of the detector unit 24. This signal is processed by one sensor channel containing a photodetector 78, a pulse amplifier 80, a pulse detector 81, an AND gate 84, and the one-shot multivibrators 83 and 82. Since each photodetector 78 surveys a space region of 30 degrees, the complete system includes twelve sensor channels, each responsive to signals emanating from a space region identified by a 30 degree arc of azimuth and each containing circuit elements such as 78, 80, 81, 84, 83, and 82.

UTILIZATION OF DATA PULSES TO GENERATE INTRUDER FLIGHT DATA SIGNALS

The output of each of the 12 one-shot multivibrators 82 is connected by a conductor 79 to an input of a sector OR gate. Herein four sector OR gates are shown and are referred to as OR gates 99a, 99b, 99c, and 99d in FIG. 3. The conductor 79 from each of the 12 one-shot multivibrators 82 is identified by the nomenclature 15°, 45°, 75°, etc. as it is joined to one of the sector OR gates in FIG. 3. Thus, as shown, there are 12 sector sensor channels joined to the four OR gates 99, there being three channels joined to each OR gate 99.

The output of a particular sector OR gate such as the OR gate 99a is positive when a positive input is received from either the 15° or the 45° or the 75° photodetector channels. The output signal from the sector OR gates 99 is utilized in flip-flop multivibrators 153, 154, 155, and 156, as is described in a later portion of this specification. An OR gate 140 is connected to the output of the four sector OR gates 99a, 99b, 99c, and 99d. The output of OR gate 140 is positive whenever a signal is received from any one of the 12 sensor channels.

Whenever an intruder aircraft is within range of the pilot warning indicator system of the reference aircraft each light energy signal received from this intruder aircraft appears as a series of three pulses at the output of the OR gate 140. The time between the start of the first of these pulses and the start of the second of these pulses is directly related to the altitude of the intruder aircraft, and the time between the start of the first pulse and the start of the third pulse is related to the heading of the intruder aircraft.

With regard to the first and second pulses, the task accomplished by the processing circuits in FIG. 3 is that of measuring the time interval between the time the first pulse starts and the time the second pulse starts. An electrical signal is derived therefrom which is representative of this time interval. This signal represents the altitude of the intruder aircraft. Then the electrical signals representative of the altitude and heading of the intruder aircraft are compared with electrical signals representative of the altitude and heading of the reference aircraft. These are compared as to the magnitude of information they represent. Then another electrical signal, an alarm signal, is created if the information represented by the compared signals is sufficiently close in magnitude to reveal that the two aircraft are dangerously close in altitude.

Of course, it is possible for the electric signal which represents the time interval between first and second pulses in the series of three pulses to be either analog or digital in nature. That is, this signal may take the form of an analog voltage, the magnitude of which represents the time interval between the first and second pulses and, hence, represents the altitude of the intruder aircraft. The electrical signal may take the form of a digital signal wherein the combination of true and false voltages appearing on a plurality of logic signal lines represents the time interval between the first and second pulses in a series thereof and hense represents the altitude of the intruder aircraft.

In the FIG. 3 embodiment of the system of this invention analog representation of the altitude signal is illustrated. This analog representation of the altitude signal is accomplished by using a ramp generator. That is, by connecting the first and second pulses of a flash to circuitry which causes the first pulse to initiate constant current charging of a capacitor and the second pulse to terminate constant current charging of the capacitor. The voltage remaining on the capacitor following constant current charging is thereby representative of the time interval elapsing between the first and second pulses and hence representative of the altitude of the aircraft transmitting the pulses.

In the FIG. 3 embodiment of the invention, the analog signal representation and ramp generator technique is also employed in measuring the time interval between the first and third pulses of the series of pulses. The time interval between the first and third pulses represents heading of the intruder aircraft.

FIG. 3 shows an altitude ramp generator 114 and a heading ramp generator 123. Each of the ramp generators 114 and 123 may, for example, consist essentially of an operational amplifier circuit having a capacitor connected between its output terminal and its negative input terminal.

Ramp generation by each of the ramp generators 114 and 123 is controlled by a flip-flop multivibrator circuit. That is, while the controlling flip-flop is in its "set" state a capacitor in the ramp generator charges and the ramp generator output voltage moves away from zero value. In this manner, a flip-flop 112 controls the altitude ramp generator 114, and a flip-flop 121 controls the heading ramp generator 123. A diode 125 is within a line 127 which joins the flip-flop 112 to the flip-flop 121.

Initiation and termination of a ramp generation cycle by the pulses appearing at the output of the OR gate 140 are accomplished in the following manner:

Initially both the flip-flop 112 and the flip-flop 121 are in the reset state, having been placed therein at the termination of the previous processing cycle. In the reset state the $\overline{Q}$ output of each of these flip-flops 112 and 121 is positive or true.

A NAND gate 142 has only one of its input terminals positive or true during this initial condition. The $\overline{Q}$ input from the flip-flop 112 is true but the Q input from the flip-flop 121 is false. Hence the output of the NAND gate 142 is true or positive during quiescence.

With the input from the NAND gate 142 being true, an AND gate 110 joined thereto, is prepared to present a true output upon receipt of the first positive pulse from the OR gate 140. This first pulse from the OR gate 140, which corresponds to the first light pulse received, therefore passes through the AND gate 110 and sets the flip-flop 112 and permits the ramp generator 114 to begin charging. The measuring of time interval between the first pulse and the second or altitude pulse has now commenced.

An AND gate 126 is also connected to the flip-flop 112 and to the OR gate 140. Thus, the first pulse from the OR gate 140 (corresponding to the first light pulse) also passes through the AND gate 126 and sets the flip-flop 121, thereby initiating charging in the heading ramp generator 123. Hence the first light pulse has initiated charging in both ramp generators 114 and 123.

Upon setting the flip-flop 112, its $\overline{Q}$ output becomes false; upon setting the flip-flop 121, its Q output becomes true. Hence the NAND gate 142 continues to have the proper input conditions to give a true output during the interval of time immediately following receipt of the first pulse from the OR gate 140. This permits the second pulse from the OR gate 140 to also pass through the AND gate 110 and is applied to the flip-flop 112. The input of the flip-flop 112 to which the AND gate 110 is connected is a toggle input. That is, it is an input which causes the flip-flop 112 to change state each time a pulse is applied thereon. Thus, the second pulse from the OR gate 140 causes the flip-flop 112 to reset, and charging in the ramp generator 114 ceases. The ramp generator 114 has thus charged during the time interval between the first and second pulses, and therefore has stored upon the capacitor thereof a charge representing the time elapsed between the first and second pulses or a charge representing the altitude of the intruder aircraft.

The resetting of flip-flop 112 has placed a true signal on the lower input of the AND gate 126. The AND gate 126 will therefore transmit the next pulse received from the OR gate 140. This next pulse from the OR gate 140 represents the third light pulse received from the transmitting intruder aircraft. This third pulse from the intruder aircraft is passed through the AND gate 126 and is received at the toggle input of the flip-flop 121 where it causes the flip-flop 121 to be reset. With the resetting of the flip-flop 121, the charging in the ramp generator 123 ceases. The charge remains on the capacitor in the ramp generator 123 and represents the time interval between the first and third pulses received from the intruder and therefore represents the heading of the intruder aircraft.

With the termination of charging of the ramp generators 114 and 123 and the retention of signals representing altitude and heading of the intruder aircraft therein, the comparison of these values with signals derived from the reference aircraft's own altimeter 14 and directional gyro 18 may begin.

The comparison between signals representing altitude of the intruder aircraft and altitude of the reference aircraft is accomplished in pulse interval limit detectors 124 and 118, and in a maximum-minimum relative altitude limit detector 116 and in a reference altitude comparator 120.

The operation of these four circuits and the utilization of their output signals are described below, following description of the circuitry which compares the signals representing heading of the intruder aircraft received from the ramp generator 123 with signals representing heading of the reference aircraft.

HEADING SIGNAL COMPARISON

The circuitry of FIG. 3 includes elements which serve to generate an electrical signal capable of distinguishing between an intruder aircraft which is a threat and an intruder aircraft which is not a threat when the intruder and the reference aircraft are flying at substantially the same altitude. That is, this portion of the circuitry distinguishes between a threatening and non-threatening intruder aircraft by comparing the headings which the two aircraft are flying and the relative positions of the two aircraft.

This heading discrimination portion of the invention, as mentioned previously, may be applied to non-aircraft or surface uses of the system, such as collision avoidance between surface vehicles, such as ships at sea. The heading discrimination portion of the invention, by itself, may be applied to a minimum cost pilot warning indicator which does not consider altitude information.

The final output of the relative heading discrimination circuitry is taken from a NOR gate 177 and is coupled into a NOR gate 129.

Before a detailed explanation of the relative heading discrimination circuitry can be embarked upon, it is necessary to consider the physical basis upon which it is possible to conclusively say that an aircraft flying at substantially the same altitude as the reference aircraft and within a given distance thereof is or is not a collision threat to the reference aircraft. In this description, these physical considerations defining a threat from a same-altitude non-threatening aircraft are referred to as Heading Threat Criteria to distinguish from the later to be described Altitude Threat Criteria.

Ultimately, a simple and useful set of heading threat criteria may be completely and concisely stated in the form of several mathematical equations in the embodiment of the pilot warning indicator system of this invention. Before considering these equations, a description of the standards and conventions employed in their derivation is helpful.

On an air map or a navigation chart, an aircraft or a ship moving due north is said to have a heading of zero degrees and this heading is customarily represented by a vector pointing upward toward the top of the sheet. In similar fashion, the heading of a craft moving due east is said to be 90° and is represented by a vector at an angle 90° removed from the due north vector and pointing perpendicularly to the right hand edge of the sheet. The heading of a craft moving due south is 180° and is represented by a vector pointing perpendicularly to the bottom edge of the sheet. So also the heading of a craft moving due west is 270° and is represented by a vector pointing perpendicularly to the left hand edge of the sheet. The heading of 360° coincides with that of zero degrees and is also represented by a vector pointing toward the top of the sheet.

In keeping with these conventions, an aircraft flying a 90° heading might be represented by some symbol, such as a dot, and its heading of 90° may be represented by a vector joining the dot, as the vector points to the right hand edge of the sheet. This dot and its associated vector could, of course, be located anywhere on the sheet, according to the position of the aircraft with relation to the other objects represented thereon.

If this convention is extended to a situation that involves two aircraft and is concerned only with the relationship of the aircraft one to the other, it is apparent that one might designate the first of these two aircraft as the reference aircraft. The reference aircraft may be represented by a symbol located near the center of a page and its course as zero degrees, with a vector pointing to the top of the sheet. The second aircraft can then be located elsewhere on the sheet according to its actual position in relation to the reference aircraft. The course of the second aircraft or intruder aircraft can be represented by a vector pointing at some angle which represents the actual heading of the intruder aircraft. For example, there is a relationship between a reference aircraft flying a heading of 60° and a second or intruder aircraft flying a heading of 170° and located behind the reference aircraft. In such event, it is convenient to draw the reference aircraft at the center of the sheet on a heading of 0° and the second aircraft somewhere in the lower right hand quadrant of the sheet on a heading of 110° moving toward the upper left quadrant of the sheet. (This result being obtained by subtracting 60° from the heading of both aircraft.)

Figure 5:
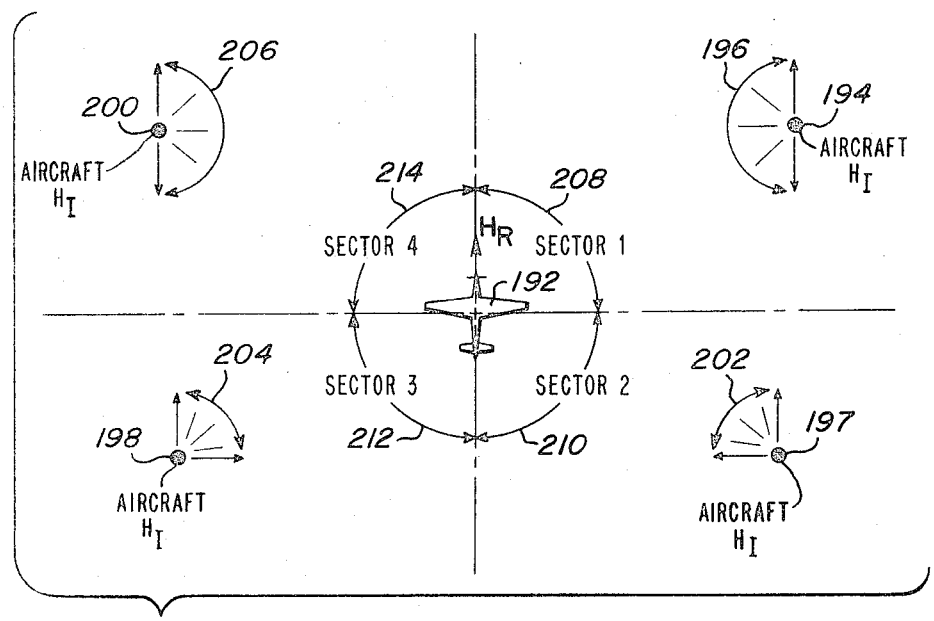
FIG. 5 is a diagrammatic view of a set of heading threat criteria which may be embodied into a pilot warning indicator system of this invention.

FIG. 5 of the drawings comprises an illustration of this type as it may be used to describe the heading threat criteria portion of this invention. In FIG. 5, a reference aircraft 192 is located near the center of the sheet, and has a heading $H_R$ of 0°. Also shown in FIG. 5, are four dots or positions 194, 197, 198, and 200 which represent four intruder aircraft. Any of these intruder aircraft may or may not represent a collision threat to the reference aircraft 192.

The heading of the aircraft 194 is considered to be along a vector which is in the family of vectors shown at 196. This family of vectors 196 is intended to represent all possible headings of the aircraft 194 between a heading of 180° and a heading of 360°.

In similar fashion, FIG. 5 shows a second arbitrary intruder aircraft 197 having a family of heading vectors 202, from 270° to 360° of heading. The intruder aircraft 198 and 200, have a family of heading vectors 204 and 206, respectively. The space around the reference aircraft 192 is divided into four quadrants which are herein called sectors 1 to 4 as identified by arcs 208, 210, 212, and 214, respectively.

Within the techniques of this invention, an intruder aircraft in any sector 1, 2, 3, or 4 is an aircraft within the range of the system and within the quadrant or sector, regardless of the altitude of the intruder aircraft. It is, however, of course, intended within this discussion that each of the intruder aircraft is flying a substantially the same altitude as the reference aircraft, so that the distinction between a threat and no-threat intruder aircraft in this portion of the discussion is not made upon the basis of altitude.

In the system of this invention, the distance between a reference aircraft and an intruder aircraft is not considered, so long as the intruder aircraft is within the range of the system carried by the reference aircraft.

Th heading threat criteria equations which apply to the four sectors are as follows:

THREAT EXISTS WHEN:

Aircraft 194 in sector 1: $H_I = H_R + 180$ to $H_R + 360$

Aircraft 197 in sector 2: $H_I = H_R + 270$ to $H_R + 360$

Aircraft 198 in sector 3: $H_I = H_R$ to $H_R + 90$

Aircraft 200 in sector 4: $H_I = H_R$ to $H_R + 180$

In these equations, $H_I$ represents the heading of the intruder aircraft under consideration, expressed in degrees. $H_R$ represents the heading of the reference aircraft, also expressed in degrees.

The sector 1 equation, for example, expressed in words, says that if the number of degrees in the heading of the intruder aircraft 194 is between 180° to 360° with respect to the heading of the reference aircraft, then the intruder aircraft is to be considered a collision threat by the system. The equations for the other sectors may be interpreted in a like manner.

Thus, the family of vectors 196, 202, 204, and 206, shown in FIG. 5 with respect to intruder aircraft 194, 197, 198, and 200, respectively, represent headings thereof which are threats to the reference aircraft 192.

These threat criteria equations include situations for least possible collision conditions. For example, it is clear that an aircraft 194 in sector 1 represents little collision threat to the reference aircraft when it flies a course of 180° or 360°. Since it would not be reassuring to a pilot to tell him that the pilot warning indicator system he is relying upon will ignore aircraft in least possible threat situations, this system retains within the threat zone even these least possible situations.

Since the heading threat criteria equations given above are expressed in terms of a constant plus a variable quantity, $H_R$ representing the heading of the reference aircraft, the equations set forth above are also applicable for any heading of the reference aircraft.

As a corollary to the threat criteria equations expressed above, it is possible to derive a set of equations which mathematically express the conditions which apply to an intruder aircraft which poses no threat of collision with the reference aircraft. It is also possible to combine portions of the threat criteria and the no-threat criteria equations in achieving an optimum mechanization which involves the smallest possible amount of electronic hardware. The no-threat equations applicable to the presently described embodiment of the invention are as follows:

NO-THREAT CRITERIA for sector 1: $H_I = H_R$ to $H_R + 180$
for sector 2: $H_I = H_R$ to $H_R + 270$
for sector 3: $H_I = H_R + 90$ to $H_R + 360$
for sector 4: $H_I = H_R + 180$ to $H_R + 360$ In these equations, the symbols and numbers have the same significance as described above for the threat criteria equations.

Once a suitable set of equations has been derived to distinguish on the basis of heading between a threat and nothreat aircraft for a particular embodiment of the system, it is necessary to mechanize these equations in some fashion. In the present embodiment of the invention a mechanization employing electronic hardware and "real-time" computation is described.

In some conceivable applications of the system of this invention in which the system is installed on a large craft which has onboard a computer for use in navigation or landing or military purposes it is possible for the heading threat equations to be mechanized in software form using the already available computer. Indeed, if this form of mechanization is carried to its ultimate limit, the computer may be used to replace the entire main control and logic unit 12, so that the detector unit 24, the altimeter 14, the directional gyro 18 and the other components of FIG. 1 are used as input or output peripherals connected to the computer.

Since it is desired that the pilot warning indicator system invention herein described may be incorporated with a minimum of alteration into existing aircraft and that it be mechanized in a form which is simple and inexpensive enough for wide spread employment in even the smallest of general aviation aircraft, mechanization of the threat and no-threat criteria equations with electronic hardware shown in FIGS. 1, 2, and 3 is described.

An analog signal representing heading of the intruder aircraft has already been developed and stored in the ramp generator 123 of FIG. 3. Since one analog voltage may be easily compared in magnitude with another analog voltage, as discussed above, the utilization of analog comparison techniques is suggested for mechanizing the threat and no-threat criteria equations. With an additional look forward toward operations which can be readily mechanized in analog hardware form, an examination of the no-threat criteria equations shows that both the sector 1 and sector 2 no-threat equations specify that the heading of a safe intruder should lie between two numerical boundary values and that the lower one of these boundary values is simply the heading of the reference aircraft.

As was explained previously, the threat and no-threat equations may be used interchangeably in mechanizing the system of this invention simply by regarding the output of a no-thread decision circuit as the logical inverse of the output from a threat decision circuit. This relationship is particularly useful in mechanizing an equation for a sector 3 criteria and an equation for a sector 4 criteria, since in the case of these sectors, both of the applicable threat equations involve lower boundary limits which are simply $H_R$, the heading of the reference aircraft. One portion of the mechanization of the sector 3 and sector 4 equations consists simply of comparing the heading of the intruder aircraft with that of the reference aircraft in a voltage comparator circuit, just as was true for the sector 1 and sector 2 equations discussed above.

Following this selection of mechanizable equations for sector 1 and sector 2 from the no-threat criteria and the selection of mechanizable equations for sector 3 and sector 4 from the threat criteria and upon rearranging the equations into their most mechanizable form, the equations finally utilized in this embodiment of the pilot warning indicator system of this invention are as shown in FIG. 6 of the drawings.

In the FIG. 6 equations the usual mathematical significance is attached to the symbols > (is greater than) and < (is less than), and the terms $H_I$ and $H_R$ represent headings of the intruder and reference aircraft, respectively, expressed in degrees.

The practice of representing heading vector angles as an analog voltage has been discussed above in connection with the ramp generators 114 and 123. This practice is also followed in the analog hardware mechanization of the finally utilized threat and no-threat equations set forth above.

Since the $H_R + 90$ and $H_R + 180$ and $H_R + 270$ terms in the finally utilized form of the threat and no-threat equations are mechanized with analog hardware employing operational amplifiers, a short description of the salient features of an operational amplifier is desirable.

For this purpose, an operational amplifier 165 in FIG. 3 and resistance elements 130 and 132 which are associated therewith, may be regarded as typical. The amplifier 165 has a negative terminal or summing node 134. An operational amplifier 162, associated with the amplifier 165, is also shown. For the purpose of this preliminary description, it is assumed that a switch 164 joined thereto, is initially open.

The most important characteristics of an operational amplifier, such as the amplifier 165, concerns the behavior of the negative (−) input terminal for operating conditions wherein the amplifier remains within its linear range. The governing rule for this negative input terminal says that current flowing into the negative input terminal from all external sources, such as from the resistance element 132, is exactly offset by the current flowing in the resistance element 130. Under these conditions, the negative input terminal remains at zero volts. Stated in another way, this rule says that the current flowing in the resistance element 132 is exactly equal to and opposite in direction to the current flowing in the resistance element 130. Because of these equal and opposite current flows, the negative input terminal of an operational amplifier, such as the terminal 134, is often called a current summing node; the current flowing into this node from external sources equals the current flowing out through the feedback resistance element 130.

Considering now the mechanization of the no-threat equations shown in FIG. 6, it is apparent that all of the $H_I < H_R$ expressions in the sector 1 and sector 2 equations may be mechanized by comparing the value of $H_I$ and $H_R$ in a voltage comparator circuit, this operation is performed by a voltage comparator 167.

The equations for sector 3 and sector 4 contain an expression $H_I < H_R$. An output representing this expression may also be obtained from the voltage comparator 167, since the expression $H_I < H_R$ is the inverse of the expression $H_I > H_R$.

The remaining terms of the finally utilized no-threat equations of FIG. 6 are in the nature of $H_I > (H_R + a$ constant), in which a signal representing the sum of two other signals is developed and then compared with the current value of $H_I$. One of these signals which is summed has a constant value. However, the other, $H_R$, varies with the heading of the reference aircraft.

Mechanization of the ($H_R + 90$) and ($H_R + 180$) and ($H_R + 270$) expressions is accomplished by the circuitry which starts with flip-flop multivibrators 153, 154, 155, and 156 and continues through the operational amplifiers 162 and 165 and culminates in an output signal on a line 178. The signal on the line 178 represents one of the three expressions desired according to the closure conditions of switches 160 and 161, which are joined to the operational amplifier 162. Operation of this circuitry is as follows:

Each of the flip-flop multivibrators 153, 154, 155, and 156 is joined to its respective sector OR gates 99a, 99b, 99c, and 99d, respectively. Each of the flip-flop mulitvibrators 153 through 156 is placed in the "set" condition whenever an intruder aircraft signal in its sector is received. For example, an intruder in sector 2 causes the flip-flop 154 to become "set." The setting of one of these four flip-flops 153 or 154 or 155 or 156 in turn establishes the appropriate input conditions for the operational amplifier 162 to generate the desired ($H_R + 90$) or ($H_R + 180$) or ($H_R + 270$) signal.

There are four paths by which external current can reach a summing node 136 of the operational amplifier 162. The first of these paths originates at a terminal 182, which is connected to the synchro to analog or digital converter 16 shown in FIG. 1.

Since the node 136 remains at zero voltage when the circuit is in operation, the current flowing in a resistance element 138, joined to the terminal 182, is representative of the magnitude of the $H_R$ signal and therefore is representative of the heading of the reference aircraft. External current can also reach the summing node 136 via paths in one or more of resistance elements 141, 143, and 144, joined thereto. Current flow in each of these resistance elements is constant in magnitude when it flows and is scaled in magnitude to represent precisely 90° of heading of the reference aircraft. Thus, when current flows in the resistance element 138 and in the resistance element 144, the total current reaching the summing node 136 is that current which represents $H_R$, plus that current which represents 90°. Since ($H_R + 90$) is the expression needed in the sector 3 no-threat equation, the operational amplifier 162 has a current input suitable for generating a signal representing the sector 3 ($H_R + 90$) term whenever switches 160 and 161 are open so that only current from the resistance elements 138 and 144 reach the summing node 136.

When an intruder aircraft is encountered in sector 1, an OR gate 157 passes a signal from the flip-flop 153 to the switch 160, causing the switch 160 to close. The closing of the switch 160 adds a current flow representing another 90 degrees of heading to the total of external current reaching the summing node 136. Under this condition the total external current reaching the summing node 136 is representative of the mathematical expression ($H_R + 180$). This is the expression desired for use in the sector 1 and in the sector 4 equations.

The OR gate 157 is connected to the flip-flops 153, 154, and 156 so that the switch 160 is closed whenever an intruder aircraft signal is received in any of the sectors 1, 2, or 4 in which the term $H_R + 180$ or $H_R + 270$ is needed.

In similar fashion, whenever an intruder aircraft is encountered in the sector 2, the switch 161 adds current flow representing a third increment of 90° of heading to the total of current reaching the summing node 136. With both the switch 160 and the switch 161 closed, the total current reaching the summing node 136 is representative of the expression ($H_R + 270$).

Thus far in this description, the operational amplifier 162 has been described only in terms of the current flow reaching its summing node or negative input terminal 136. Since this total input current reaching the summing node 136 must be exactly offset by current flow in a resistance element 146 joined thereto if the amplifier 162 is to remain in its linear operating range, the output of terminal voltage of the operational amplifier 162 will change in direct proportion to the external current reaching the node 136. The output of the amplifier 162 will, however, move in the negative direction; that is, current from a source of positive voltage 187 connected to the resistance element 144 will induce a negative-going voltage at the output of the amplifier 162. The signal at the output terminal of operational amplifier 162 is therefore representative of the quantity $-(H_R + 90)$ or $-(H_R + 180)$ or $-(H_R + 270)$, depending upon the state of closure of the switches 160 and 161. Hence, the signal depends upon the sector 1, 2, 3, or 4 in which the intruder aircraft is located.

In describing the signals generated by the heading ramp generator 123 and the gyro compass converter 16, a correlation between signal voltage and aircraft heading vector was described. It was stated in describing these devices that a particular heading vector could be represented by a predetermined voltage signal. In this fashion a heading vector at an angle of 180° might, for example, be represented by a voltage of 2.0 volts and a heading vector at an angle of 36.° by a voltage of 4.0 volts. Although this practice of relating a heading vector to a voltage value is convenient for measuring signals and for transmitting signals between different portions of the circuit, the preceding discussion regarding the operational amplifiers 165 and 162 demonstrates that it is most convenient to consider the imputs to an operational amplifier in terms of current signals, rather than voltage signals.

Returning now to the signals flowing in the circuitry in which the operational amplifiers 162 and 165 are involved, it was previously described that the voltage output of the operational amplifier 162 represents alternately one of the quantities $(H_R + 90)$, $(H_R + 180)$ and $(H_R + 270)$. Since the operational amplifier 165 is an inverting amplifier, these signals are inverted once again in passing from the output of the operational amplifier 162 to the output of the operational amplifier 165 so that the desired quantities $+(H_R + 90)$, $+(H_R + 180)$ and $+(H_R + 270)$ are transmitted to the signal line 178.

Before describing the circuitry which compares the intruder heading signal $H_I$ with the safe limits which it may have as these limits are represented by the voltage signal appearing on line 178, description of the function of a voltage comparator 163 and its associated circuitry is appropriate.

Previously in describing the ramp heading generator 123, it was mentioned that the output voltage delivered by the ramp generator 123 represents the heading of the intruder aircraft under consideration and that this heading is at some angle between 0° and 360°. The signal available from the ramp generator 123 is, therefore, a voltage representing a heading which is between an angle of 0° and 360°. The previous description of the heading threat criteria indicated that the output of the ramp generator 123 is compared with two other voltages. One of these voltages represents the vector $H_R$, the heading of the reference aircraft, and the other voltage represents the quantity $(H_R + 90)$ or $(H_R + 180)$ or $(H_R + 270)$. Since the heading vector of the reference aircraft also falls between an angle of 0° and 360°, the desired comparison between the signal from the ramp generator 123 and the $H_R$ signal is made with little difficulty, that is, since the two comparable signals each represent values between 0° and 360° and since each has the same peak amplitude, the two signals are directly comparable and may be compared in a simple voltage comparator circuit, such as in the voltage comparator 167.

Comparison of the output signal from the ramp generator 123 and a signal representing the $(H_R + 90)$ or $H_R + 180)$ or $(H_R + 270)$ quantities may, however, involve a scalar difference, because of the nature of these three signals. This may be illustrated by an example: If the reference aircraft has a heading of 300° it is clear that the signal representing the quantity $(H_R + 180)$ will have an amplitude larger than 360° and will, in fact, represent a vector angle of 480°. In a similar fashion, both the $(H_R + 90)$ and the $(H_R + 270)$ quantities also represent a vector at an angle larger than 360° for the case in which the reference aircraft has a heading of 300°. No difficulty is presented in mechanizing this larger than 360° quantity in the operational amplifier 162, since current flow from each of the resistances 138, 141, 143, and 144 may successively raise its output voltage. The difficulty comes however, when this signal representing an angle larger than 360° must be compared with a signal representing an angle less than 360°, such as the signal $H_I$ emanating from the ramp generator 123. Clearly these two signals are not comparable.

One solution to this condition involves the voltage comparator 163 and the switch 164. In this solution, the voltage comparator 163 compares the output of the voltage of the operational amplifier 162 with a voltage representing a vector angle of 360°, and upon finding that the output of the amplifier 162 is in fact a signal representing a vector angle larger than 360° causes the switch 164 to close. Closure of the switch 164, in turn, causes current representing a vector angle of 360° to subtract from the summing node 134 of the operational amplifier 165. Since signals at the output terminal of the operational amplifier 162 are negative-going in polarity, the comparison in the comparator 163 is made with an inverted $e_r$ voltage, that is, with $(-e_r)$ and the subtraction of current flowing in the switch 164 is accomplished with current flowing from a positive version of the $e_r$ voltage, that is, $(+e_r)$. This subtraction of a 360 degree signal permits direct voltage comparisons to be made between the $H_I$ signal output from the ramp generator 123, which represents angular values between 0° and 360°, and signals from the line 178, which represent the quantities $(H_R + 90)$, $(H_R + 180)$ and $(H_R + 270)$, and which may have vector angles larger than 360°, since these signals have now been represented by vectors having angular values between 0° and 360°. This comparison is made in a voltage comparator 166 to which the line 178 is connected as an output conductor of the amplifier 165.

The output of the voltage comparator 163 is also applied to logic gates 170 and 172, which mechanize the heading threat criteria equations of FIG. 6. The need for altering the heading threat criteria equations in this fashion when the output of the voltage comparator 163 represents a vector angle exceeding 360 degrees will be described following an explanation of the logic mechanization of the equations.

LOGICAL MECHANIZATION OF HEADING CRITERIA EQUATIONS

A line 179 joins the output of the NOR gate 177 to an input to the NOR gate 129. In relation to the NOR gate 129, a true signal on the line 179 is indicative of a no-threat condition. If this no-threat is related to the inputs of the NOR gate 177, both inputs to the NOR gate 177 remain false. The succeeding logic circuits, the audible alarm 32, and the visual display unit 30, thus sense that a no-threat condition exists.

The voltage comparator 167 compares the $H_I$ signal and the $H_R$ reference signal as it appears on a terminal or line 183, shown in FIGS. 2 and 3.

The first condition to be examined in describing the voltage comparators 166 and 167 and their succeeding logic circuitry is that which makes the logical output signal from both comparator circuits false. The output of the voltage comparator 167 is false (low in magnitude) whenever the $H_I$ signal is larger in magnitude than the $H_R$ signal received on the line 183. In a similar fashion, the output of the voltage comparator 166 is false whenever the $H_I$ signal is smaller than the reference signal on the line 183.

If this condition, wherein the $H_I$ signal is larger than the $H_R$ signal and the $H_I$ signal is smaller than the reference signal, is compared with the threat criteria equations shown in FIG. 6, it is seen that this condition is shown in the sector 1 equation. In other words, an intruder aircraft located in sector 1 produces signals which are in accord with this first selected, false, condition of the $H_I$ and $H_R$ signals when the intruder is a no-threat aircraft.

If these selected conditions for the $H_I$ signal are actually the conditions which are produced by a no-threat sector 1 intruder aircraft, then the sector 1 equation requires that these conditions cause the circuitry of FIG. 3 to inhibit presentation of the threat warning signal which is otherwise produced upon the reception of any signals by the detector unit 24.

The false output of both voltage comparators 166 and 167 when applied to an OR gate 168 produces thereon a false output signal. Since the intruding aircraft is in sector 1, only an AND gate 175 is enabled, and the false signal passes through the AND gate 175. Since a false signal on the input terminal of the AND gate 175 remains false for the sector 1 no-threat intruder, a no-threat signal is passed into the NOR gate 177.

Thus, so long as an intruder aircraft is located in sector 1 and the AND gate 175 is enabled and if both inputs to the OR gate 168 are false, a no-threat condition exists.

Thus, if either input to the OR gate 168 becomes true while the AND gate 175 is enabled by sector 1 signals, then a threat warning signal (a true signal) is generated at the input of the NOR gate 177.

At this point the correlation between the sector 1 equation of FIG. 6 and the circuitry shown in FIG. 3 has been established for possible states in which the independent variable $H_I$ may exist. As a next step in this description, the correlation between the sector 2 equation shown in FIG. 6 and the circuitry of FIG. 3 is considered. This considers the condition wherein an intruder aircraft is located in sector 2.

When the circuitry of FIG. 3 receives signals from an intruder aircraft located within sector 2, the flip-flop multivibrator 154 is in a "set" condition and the output of an OR gate 158 is a true signal. This true signal causes the AND gate 175 to be enabled. Since the AND gate 175 is enabled for a sector 2 intruder aircraft, just as it was for a sector 1 intruder aircraft, the path by which a signal travels from the output of voltage comparators 166 and 167 to the input terminals of the NOR gate 177 is identical to the path traveled by a sector 1 signal between these points. Therefore, the same rule that a true signal at either input of the OR gate 168 produces a threat warning signal, while a false input signal at either input of the OR gate 168 inhibits the production of a threat warning signal, is applicable to the sector 2 signal situation as was applicable to the sector 1 signal situation.

The performance of the voltage comparators 166 and 167 for the sector 2 intruder aircraft situation is identical to the performance described for a sector 1 intruder. If the similarity between logic circuit and comparator circuit operation in sectors 1 and 2 are combined and summarized, the result is that for a sector 2 intruder aircraft, the circuitry of FIG. 3 produces a no-threat signal at the inputs to the NOR gate 177 so long as the $H_I$ signal on a line 181 is greater than the $H_R$ signal on the terminal 183. Less than the reference signal on the line 183 produces a threat (true) signal at the inputs of the NOR gate 177 if the $H_I$ signal on the line 181 becomes smaller than the $H_R$ signal on the terminal 183 or if the $H_I$ signal on the line 181 becomes greater than the reference signal on the line 178. These conditions are shown in the equations of FIG. 6.

When the circuitry of FIG. 3 receives signals from an intruder aircraft located within sector 3, the flip-flop multivibrator 155 is in a "set" condition, and the output of an OR gate 159 is in a true condition. This true signal causes an AND gate 176 to be enabled, rather than the AND gate 175, as occurred when there was an intruder aircraft located in sector 1 or sector 2.

The enabling of the AND gate 176 and the disabling of the AND gate 175 changes the path by which signals travel from the output of voltage comparators 166 and 167 to the input terminals of the NOR gate 177. A NAND gate 174 comes into operation in the circuit. The NAND gate 174 inverts the signals applied to the input of the OR gate 163, so that now a true signal is applied to the input of the OR gate 168 and produces a no-threat (false) signal at the inputs of the NOR gate 177. The reversal of signal polarity at the input of the OR gate 168 to produce a no-threat signal at the input of the NOR gate 177 means that so long as either of the inputs to the OR gate 168 receives a true signal, a no-threat signal is produced at the input of the NOR gate 177.

If both inputs to the OR gate 168 are false, a threat signal is produced at the input of the NOR gate 177. The requirements for both inputs to the OR gate 168 to be false are that both the $H_I$ signal on the line 178 be larger than the $H_R$ signal on the terminal 183 and that the $H_I$ signal on the line 181 be smaller than the reference family signal on the line 183. These conditions in equation form are shown in FIG. 6 with regard to an intruder aircraft in sector 3.

Just as the behavior of the FIG. 3 circuitry is similar for signals indicating a sector 1 and sector 2 intruder aircraft, so also the circuit behavior for a sector 3 and sector 4 aircraft is similar. The only difference between the signals encountered in the processing of a sector 3 intruder aircraft and those encountered in the processing of a sector 4 intruder aircraft are the reference family signals representing the $(H_R + 90)$ and $(H_R + 180)$ expressions respectively.

Just as is the case between a sector 1 and a sector 2 aircraft, these differences in the reference family signal have no influence on the operation of the logic circuitry and are accommodated by changing the state of closure of the switches 160 and 161. (Specifically the switch 160 is closed for the $(H_R + 180)$ value needed in sector 3 and open for the $(H_R + 90)$ value needed in sector 4, and switch 161 is open for both values.) This similarity of processing for the sector 3 and sector 4 signals has its basis in the similarity of the form of the sector 3 and sector 4 equations shown in FIG. 6.

The output of the voltage comparator 163 is false or low in level when the reference family signal on the line 178 has a value representing a vector angle smaller than 360°. If the output of the voltage comparator 163 is false, then the output of the NAND gate or inverter circuit 170 is true and an AND gate 171 is enabled. With the AND gate 171 enabled, signals pass from the output of the OR gate 168 to the output of an OR gate 173. That is, under these conditions neither of the logic gates 171 and 173 has any inverting or delaying properties to change the signal received from the OR gate 168 in transmitting the signal to the output terminal of the OR gate 173.

If the reference family signal does exceed a value representing an angle of 360°, the AND gate 172 is enabled and the AND gate 171 is disabled. In this condition the inputs to an AND gate 169 must be considered in relating the voltage comparator input signals to a no-threat (false) signal at the input of the NOR gate 177.

For describing the circuitry in this form over 360°, it is again convenient to first assume that the intruder aircraft is in sector 1 so that the AND gate 175 is enabled. With the AND gates 172 and 175 enabled, a no-threat (false) signal at the input to the NOR gate 177 is realized whenever either one of the two inputs to the AND gate 169 is false. If this condition is related to the signal inputs of the voltage comparator circuits 166 and 167, it is found that a threat signal is generated at the input of the NOR gate 177 whenever the $H_I$ signal on the line 181 is greater than the $H_R$ signal on the line 183 or whenever the $H_I$ signal on the line 181 is less than the reference family signal on the line 183. So long as either one of these conditions is met, the output of one of the voltage comparators 166 or 167 is false (low in value) and a no-threat (false) signal is applied to the input of the NOR gate 177. This condition is mathematically stated in the sector 1 equation shown in FIG. 7.

Again if it is considered that the logic signals applied to the AND gates 171 and 175 do not change and only the magnitude of the reference family signal on the line 178 changes, when the intruding aircraft is located in sector 2 rather than sector 1, then a parallel may be drawn between the equation needed to define a no-threat aircraft in sector 2 and the equation needed for a no-threat aircraft in sector 1. Relying upon this parallel, it is possible to write the sector 2 equation shown in FIG. 7 as the mathematical expression which defines the operation of the FIG. 2 circuitry when the intruder aircraft is located in sector 2 and the reference family expression has a value larger than 360°.

Now if it is assumed that the intruding aircraft is located in sector 3, so that the AND gate 176 is enabled, rather than the AND gate 175, a mathematical condition exists which defines the behavior of the FIG. 3 circuitry for an intruder located in sector 3 with a reference family expression larger than 360°.

With the AND gate 172 and 176 enabled, a no-threat (false) signal at the input to the NOR gate 177 is realized whenever both inputs to the AND gate 169 are true. If this condition is related to the signal inputs of the voltage comparator circuits 166 and 167, it is found that a no-threat signal is generated at the input of the NOR gate 177 whenever the $H_I$ signal on the line 181 is less than the $H_R$ signal on the line 183 and the $H_I$ signal on the line 181 is greater than the reference family signal on the line 178.

If both of these conditions are met, the output of the AND gate 169 is true and a no-threat signal is applied to the input of the NOR gate 177. This set of conditions is mathematically stated in the sector 3 equation in FIG. 7.

If it is considered that the logic signals applied to the AND gates 171 and 175 do not change and only the magnitude of the reference family signal on the line 183 changes if the intruding aircraft is located in sector 4 rather than sector 3, then a parallel may be drawn between the equation needed to define a no-threat aircraft in sector 4 and the equation needed for such a condition in sector 3. Relying upon this parallel, it is possible to write the sector 4 equation shown in FIG. 7 as the mathematical expression which defines the operation of the circuitry when the intruder aircraft is located in sector 4 and the reference family expression has a value larger than 360°.

If the heading threat criteria equations shown in FIG. 7 are compared with those shown in FIG. 6, it is apparent that they differ only in that the ∮ symbols in FIG. 6 are replaced by the word "or" in FIG. 7, and the word "or" in the FIG. 6 equations is replaced by the symbol ∮ in FIG. 7.

Electrically this difference between the FIG. 6 equations and the FIG. 7 equations has been mechanized by using the signal path involving the OR gate 168 and the AND gate 171 for the FIG. 6 version of the equations and by using the signal path involving the AND gate 169 and the AND gate 172 for the FIG. 7 version of the equations.

UTILIZATION OF THREAT AND NO-THREAT SIGNALS

A pulse amplifier 248, a one-shot multivibrator 250 are joined in series to the audible alarm 32 shown in FIG. 1, and the series is connected to the output of an AND gate 251.

At this point in the description of the circuitry of FIG. 3, the flow of electrical signals has been considered up to the point of comparing both the altitude and heading signals received from the intruder aircraft with the altitude and heading signals of the reference aircraft. At this point also, the basis upon which the outcome of comparing the heading signal portion of these intruding and reference aircraft signals can be declared to constitute a threat or a no-threat condition has been described.

FIG. 3 includes circuitry which provides an indication to the pilot of the reference aircraft as to the outcome of the comparison between intruding and reference aircraft signals if a threat condition exists.

The altitude pulse interval limit detector circuit 118, the maximum-minimum relative altitude limit detector 116, and the heading threat criteria circuitry culminating with NOR gate 177 are included in the elements which provide a false or low level signal to one of the input terminals of the NOR gate 129 if a threat condition exists.

In describing the function of the NOR gate 129 and the circuitry which follows it, it is stated above that any of the circuits connected to the inputs of the NOR gate 129 can furnish a true input to the NOR gate 129, thereby causing the output of the NOR gate 129 to become false, if a no-threat condition exists. The output of the NOR gate 129 may therefore be regarded as an inhibit signal. So long as all of the inputs to NOR gate 129 are false, thereby indicating the intruder is a threat, the output of the NOR gate 129 is true and no inhibiting of the warning signals occurs. If any of the inputs to the NOR gate 129 become true, thereby indicating the intruder aircraft is not a threat, then the output of the NOR gate 129 becomes false and processing of the warning signals is inhibited.

With this introduction as to the function of the NOR gate 129 and its input signals, it is convenient to examine the type of warning signals provided by the circuitry of FIG. 3 to the pilot of the reference aircraft. The FIG. 3 embodiment provides two such warning signals, the visual display 30 and the audible alarm 32.

The AND gate 251 controls the operation of both the audible alarm 32 and the visual display 30. The upper input terminal of the AND gate 251, which is connected to the $\overline{Q}$ output of flip-flop 121, controls the time at which a warning signal may be given to the pilot of the reference aircraft. When the flip-flop 121 is reset upon receipt of the third flash pulse from an intruder aircraft, a positive-going signal is applied to the upper input terminal of the AND gate 251. This positive pulse causes the output of the AND gate 251 to become true, if there has been no warning inhibit (false) signal received at the lower terminal of the AND gate 251. The signal applied to the upper terminal of the AND gate 251 is momentary in duration, because it is joined to a capacitor 253 in a line 256 which connects with the flip-flop 121. The momentary nature of this AND gate 251 signal assures that the warning circuits do not respond to information they receive from the NOR gate 129 a relatively long time after the reset of the flip-flop 121.

One of the warning circuits which is controlled by the AND gate 251 consists of the audible alarm 32, and its associated circuits, the one-shot multivibrator 250 and the pulse amplifier 248. The pulse amplifier 248 serves the function of amplifying signals received from the AND gate 251 into a form suitable for triggering the one-shot multivibrator 250. When a positive going pulse is received from the AND gate 251 the one-shot multivibrator 250 is triggered and provides a signal which activates the audible alarm 32 for a predetermined short period of time, for example ½ second. The time duration of the signal from the audible alarm 32 may, of course, be adjusted according to preference by changing the duration of one-shot multivibrator 250.

The other warning circuit which is controlled by the AND gate 251 consists of the reference altitude comparator 120 and the associated visual display 30, shown in FIG. 1.

Upon receipt of a true signal from the AND gate 251, a switch element 264 applies the analog signal stored in the altitude ramp generator 114 to the input of the reference altitude comparator 120 and commences the events by which lamps in the display indicators are illuminated. The switch element 264 may consist of a relay in a slower operating embodiment of the invention or may consist of a transistor, such as a field effect transistor, in faster operating embodiments of the invention.

The reference altitude comparator 120 may be regarded as the mechanization of a set of altitude threat criteria equations in a fashion parallel to the heading threat criteria equations of FIGS. 6 and 7 and their mechanization in the FIG. 3 circuitry. In the case of altitude threat criteria, however, the formality of writing equations is unnecessary because of the relatively simple boundaries involved.

An intruder aircraft which is flying, for example, at an altitude which is more than 500 feet different from that of the reference aircraft is deemed to be a no-threat aircraft regardless of its heading. In a similar fashion an intruder aircraft which is flying, for example, at an altitude less than 100 feet removed from that of the reference aircraft is deemed to be a special class of threat. The FIG. 3 circuitry is capable of giving a special warning signal upon receipt of signals indicating a threat aircraft is, for example, within this 100 foot differential in relative altitude.

It is, of course, intended that the scope of the present invention not be limited to these ranges, as threat or no-threat criteria.

The circuit called the maximum-minimum relative altitude limit detector 116 is another in the group of three circuits which can inhibit the processing of signals from the intruder aircraft if it determines from the flash signals received from the intruder aircraft that the intruder aircraft represents no collision threat. The maximum-minimum relative altitude limit detector 116 provides an inhibit signal to the NOR gate 129 upon comparing the signal representing the altitude of the intruder aircraft obtained from the ramp generator 114 and the signal representing altitude of the reference aircraft obtained from a terminal 269, which is joined to the altimeter 14, as shown in FIGS. 1 and 2. This output signal is generated when the intruder aircraft is more than a predetermined altitude above or below the altitude of the reference aircraft.

The circuits included within the reference altitude comparator 120 are required to perform a comparison between two analog signals, the intruder heading signal, received from the altitude ramp generator 114, and the reference aircraft altitude signal, as received on the terminal 269.

The output from the reference altitude comparator 120 includes signals applied to two lines, an "up" line 295, and a "down" line 297. The up line 295 is driven in a positive-going direction when signals are received indicating an intruder aircraft is located less than a predetermined altitude above the reference aircraft, and the other of these lines, the down line 297, is driven in a positive-going direction when signals are received indicating an intruder aircraft is located less than a predetermined altitude below the reference aircraft. If the intruder aircraft is located within a predetermined very small differential altitude above or below the reference aircraft, both the line 295 and the line 297 outputs of the reference altitude comparator 120 are driven positive. Thus, both an upper lamp 34a and a lower lamp 34b are lighted. FIG. 3 shows one set of lamps 34a and 34b. Actually, within the system herein described and shown in FIG. 4, there are 12 sets of lamps 34a and 34b, there being one set of lamps 34a and 34b for each angular position represented in FIG. 4.

The up line 295 and the down line 297 signals from the reference altitude comparator circuit are applied to the lamps 34 of the visual display unit 30 shown in detail in FIG. 4.

As shown in FIG. 4, each lamp unit 34 has a silicon controlled rectifier (SCR) 300 connected in series therewith to receive the momentary pulse signals emanating from reference altitude comparator circuit 120. Each SCR in the display unit 30 permits its respective display lamp 34 to remain illuminated for the full time period of the one-shot multivibrator 83 even though the pulse from the reference altitude comparator 120 is very short in duration. Each lamp 34 is joined by a conductor 301 to its respective one-shot multivibrator 83. The memory capability of an SCR enables the brief low energy pulses emanating from the reference altitude comparator 120 to control the relatively high energy, long duration illumination of the indicator lamps 34. In FIG. 4, a lamp 34 in the upper portion of the 45 degree sector is illustrated as being lighted to indicate the presence of an intruder aircraft within the 45° sector and above the reference aircraft and within a predetermined altitude with respect to the altitude of the reference aircraft.

When the illumination period determined by the respective one-shot multivibrators 83 in any of the twelve sensor and pulse amplifier circuits has ended, the current flow in the respective SCR 300 is interrupted and it is thereby reset to the non-conducting state.

TERMINATION OF A PROCESSING CYCLE

Following the display and sounding of a warning signal to the pilot of the reference aircraft, it is necessary to return the portions of the FIG. 3 circuitry having memory capability to their original or quiescent state in preparation for commencing the processing of newly arriving data from the same or a different intruder aircraft.

In addition to the normal return-to-quiescent state necessary in the FIG. 3 system it has also been found from practical experience with the pilot warning indicator system that it is necessary to provide several auxiliary or special reset signals in the system for occasions when the system receives non-coded information such as that emanating from a land based flash beacon or receives signals from naturally occurring sources such as the sun, moon, etc.

First the normal reset operation occurring at the end of an information processing cycle is described. The operating cycle terminates with the flip-flop multivibrator 121 being reset by the third of the sequence-of-three data flash pulses, and prior to this time, reception of the second data pulse has reset flip-flop multivibrator 112. Also, as stated above, upon resetting the flip-flop multivibrator 112, the altitude ramp generator 114 is placed in a hold condition and upon resetting the flip-flop multivibrator 121, the heading ramp generator 123 is placed in a hold condition.

As a result of both flip-flop multivibrators 112 and 121 being reset at the end of the data reception portion of the operating cycle, the most important memory-capable portions of the circuitry which require resetting at the end of a normal operating cycle are the two ramp generators 114 and 123. The resetting of these two circuit elements is accomplished a short time following reset of the flip-flop multivibrator 121 by delay one-shot multivibrators 302 and 304 for resetting the ramp generators 123 and 114, respectively. A short time interval is allowed by the one-shot multivibrators 302 and 304, following reset of the flip-flop multivibrator 121 and before the ramp generators 123 and 114 are reset. This short time interval permits signal utilization circuits, such as the altitude limit detector 116 and the reference altitude comparator 120, to receive ramp generator signals and act upon them before they are removed by the resetting operation. This delay period need be only a small fraction of a second and may even be but a few micro-seconds in length.

It is also noted that the pulse generated by delay one-shot multivibrator 302 is applied as a reset pulse to the flip-flop multivibrators 153, 154, 155, and 156. The information stored in these four flip-flop multivibrators is no longer needed after the reference altitude comparator 120 has received and acted upon signals from the altitude ramp generator 114.

A special condition reset circuit incorporated into the circuitry of FIG. 3 is embodied into the pulse interval limit detector circuit 118. This circuit is essentially a voltage comparator circuit which can be mechanized in the same fashion as voltage comparators 163, 166, and 167. In performing this pulse interval limit detector function, the pulse interval detector circuit 118 determines if the altitude ramp signal generated by altitude ramp generator 114 has reached a pre-set value which would be indicative that the system has received an improper input signal such as a single pulse flash from a non-coded flash lamp or a lightning flash, etc. In other words, if the system has received a first pulse but has failed within a given period of time to receive a proper second pulse indicative of an altitude signal, the altitude ramp generator 114 is started by the received first pulse but since no second pulse is received the ramp generator 114 is not placed in the hold condition. In this situation the voltage output of the altitude ramp generator 114 changes until the output reaches a pre-set limit established by the pulse interval limit detector circuit 118.

A reset signal then is applied to the flip-flop multivibrators 112 and 121 so that the system is conditioned for accepting a new set of data pulses. A signal from the pulse interval limit detector 118 is also applied to the NOR gate 129 to inhibit the display of any warning signals to the pilot of the reference aircraft when a false signal lacking the proper three pulse sequence is received by the system.

In a manner similar to that described for pulse interval limit detector 118, which measures the output of the altitude ramp generator 114, the pulse interval limit detector 124 measures the output of the heading ramp generator 123 and provides an output pulse which resets the flip-flop multivibrator 121 if the system has received two of the sequence-of-three data pulses but fails to receive an expected third pulse.

Thus, the apparatus of this invention provides means by which the information regarding the flight condition, for example, altitude and/or heading, of an aircraft is disseminated into the region surrounding the aircraft. The apparatus includes means for comparing the flight condition information of two aircraft and for providing an alarm if the compared flight condition information indicates the possibility of a collision between the two aircraft.

It is to be understood that, within the purview of this invention, means other than optical may be employed for transmission of flight condition information regarding an aircraft.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. An indicator system for an aircraft comprising:
   control and logic means,
   flight condition responsive means joined to the control and logic means for providing signals thereto which have relationship to the flight condition of the aircraft,
   flashlamp means joined to the control and logic means for providing spaced-apart pulses of light energy in which the time spacing of the pulses is in relationship to the flight condition of the aircraft,
   detector means for sensing light energy, the detector means being joined to the control and logic means for providing pulse signals in accordance with pulses of light energy received by the detector means from another aircraft,
   alarm means joined to the control and logic means,
   the control and logic means including means for comparing the flight condition of said other aircraft with the flight condition of the first said aircraft and for providing a signal to the alarm means if the possibility of a collision between said other aircraft and the first said aircraft exists.

2. The system of claim 1 in which the flight condition responsive means includes altitude responsive means.

3. The system of claim 1 in which the flight condition responsive means includes heading responsive means.

4. The system of claim 1 in which the flight condition responsive means includes altitude responsive means and heading responsive means.

5. The system of claim 1 in which the alarm means comprises both audible and visual alarm means.

6. The system of claim 1 in which the alarm means comprises audible alarm means.

7. The system of claim 1 in which the alarm means comprises visual alarm means.

8. The system of claim 1 in which the control and logic means includes means for comparing the heading and altitude of said other aircraft with the heading and altitude of the first said aircraft and for providing a signal to the alarm means if the possibility of a collision between said other aircraft and the first said aircraft exists.

9. The system of claim 1 in which the alarm means includes a plurality of lamps arranged in annular formation, each of the lamps having an upper portion to indicate a position above the first aircraft and a lower portion to indicate a position below the first aircraft, the lamps being arranged to indicate bearing of another aircraft.

10. The system of claim 1 in which the detector means comprises a plurality of light sensitive members, each of which is arranged to receive light energy from a portion of 360 degree field.

11. Apparatus for generating and transmitting pulsed optical signals indicative of the heading of an aircraft which supports the apparatus, said apparatus comprising:
    omni-directionally radiating high intensity electrical-to-optical transducer means mounted upon the exterior of said aircraft,
    heading sensing means sensing the heading of said aircraft, said heading sensing means having a signal output which includes an electrical signal indicative of the heading of said aircraft,
    a first electrical timing circuit having an output of periodically occuring first electrical timing signals,
    a second electrical timing circuit joined to the first electrical timing circuit and to the heading sensing means, the second electrical timing circuit receiving signals from the first electrical timing circuit and discharging a second electrical timing signal delayed in time from said first electrical timing signal by a time interval related to the signal output received from the heading sensing means,
    electrical power supply means joined to the transducer means and conducting a pulse of electrical energy to said electrical-to-optical transducer means upon receipt of said first electrical timing signal and upon receipt of said second electrical timing signal,
    flashlamp means,
    a first capacitor,
    means connecting the first capacitor to the flashlamp means,
    a firing device,
    means connecting the firing device to the flashlamp means,
    a second capacitor, the second capacitor having a much larger electrical capacity than the first capacitor,
    means joining the second capacitor to a source of electrical energy,
    electronic switch means, the switch means having a control element,
    means joining the electronic switch means to the first capacitor and to the second capacitor,
    electronic time delay means having an output portion and an input portion,
    means joining the output portion of the time delay means to the firing device,
    flash control means,
    means joining the input portion of the time delay means and the control element of the electronic switch means to the flash control means.

12. The circuitry of claim 11 in which the firing device is a transformer.

13. The circuitry of claim 11 in which the electronic switch device is a silicon controlled rectifier having a cathode, an anode, and a gate, the gate being the control element, the anode of the silicon controlled rectifier being connected to the second capacitor, the cathode of the silicon controlled rectifier being connected to the first capacitor, and the gate being connected to the flash control means.

14. The circuitry of claim 11 in which the electronic time delay means is a multivibrator.

15. The circuitry of claim 11 in which the flashlamp means includes a flashlamp having a trigger electrode, an anode, and a cathode,
    the first capacitor being connected between the anode and the cathode of the flashlamp,
    the firing device being connected to the trigger electrode of the flashlamp.

16. The circuitry of claim 11 in which the flash control means includes rate generator means and delay multivibrator means.

17. The circuitry of claim 16 which includes altitude sensitive means,
means joining the delay multivibrator means to the altitude sensitive means.

18. The circuitry of claim 16 which includes heading sensitive means, and means joining the delay multivibrator means to the heading sensitive means.

19. Apparatus for generating and transmitting pulsed optical signals indicative of the heading of an aircraft which supports the apparatus, said apparatus comprising:
omni-directionally radiating high intensity electrical-to-optical transducer means mounted upon the exterior of said aircraft,
heading sensing means sensing the heading of said aircraft, said heading sensing means having a signal output which includes an electrical signal indicative of the heading of said aircraft,
a first electrical timing circuit having an output of periodically occurring first electrical timing signals,
a second electrical timing circuit joined to the first electrical timing circuit and to the heading sensing means, the second electrical timing circuit receiving signals from the first electrical timing circuit and discharging a second electrical timing signal delayed in time from said first electrical timing signal by a time interval related to the signal output received from the heading sensing means,
electrical power supply means,
means joining the electrical power supply means to the transducer means and conducting a pulse of electrical energy to said electrical-to-optical transducer means upon receipt of said first electrical timing signal and upon receipt of said second electrical timing signal,
flashlamp means,
capacitor means,
firing means,
means connecting the firing means to the flashlamp means,
means joining the capacitor means to the electrical power supply means,
electronic switch means,
means joining the electronic switch means to the capacitor means,
electronic time delay means,
means joining the time delay means to the firing means,
flash control means,
means joining the time delay means and the electronic switch means to the flash control means.

* * * * *